(12) United States Patent
Sultenfuss et al.

(10) Patent No.: US 11,416,059 B2
(45) Date of Patent: Aug. 16, 2022

(54) MULTIMODE USB-C POWER TRANSMISSION AND CONVERSION SUPPORTING IMPROVED BATTERY UTILIZATION

(71) Applicant: Dell Products, L.P., Round Rock, TX (US)

(72) Inventors: Andrew Thomas Sultenfuss, Leander, TX (US); Richard C. Thompson, Cedar Park, TX (US)

(73) Assignee: Dell Products, L.P., Round Rock, TX (US)

( * ) Notice: Subject to any disclaimer, the term of this patent is extended or adjusted under 35 U.S.C. 154(b) by 177 days.

(21) Appl. No.: 16/751,993

(22) Filed: Jan. 24, 2020

(65) Prior Publication Data

US 2021/0232202 A1 Jul. 29, 2021

(51) Int. Cl.
| | |
|---|---|
| G06F 1/26 | (2006.01) |
| G06F 1/32 | (2019.01) |
| G06F 1/3212 | (2019.01) |
| H02J 7/04 | (2006.01) |
| H02J 7/00 | (2006.01) |
| G06F 1/3246 | (2019.01) |

(52) U.S. Cl.
CPC .......... *G06F 1/3212* (2013.01); *G06F 1/3246* (2013.01); *H02J 7/0063* (2013.01); *H02J 7/0068* (2013.01); *H02J 7/04* (2013.01); *H02J 7/0045* (2013.01)

(58) Field of Classification Search
CPC ...... G06F 1/3212; G06F 1/3246; G06F 1/203; G06F 1/263; H02J 7/04; H02J 7/0068; H02J 7/0063; H02J 7/0045
See application file for complete search history.

(56) References Cited

U.S. PATENT DOCUMENTS

| | | | | |
|---|---|---|---|---|
| 2015/0311738 | A1* | 10/2015 | Odaohhara | H02J 7/34 320/128 |
| 2015/0340861 | A1* | 11/2015 | Wang | H02J 7/022 307/125 |
| 2017/0271894 | A1* | 9/2017 | York | H02J 7/0026 |
| 2020/0228046 | A1* | 7/2020 | White | H02P 29/0241 |

OTHER PUBLICATIONS

"Buck converter", Nov. 3, 2017, Wikipedia, pp. 3-5 (Year: 2017).*

* cited by examiner

*Primary Examiner* — Xuxing Chen
(74) *Attorney, Agent, or Firm* — Fogarty LLP

(57) ABSTRACT

Systems and methods are provided for powering an Information Handling System (IHS) that receives a high-power transmission from a multimode AC adapter supporting USB-PD transmission and also supporting the high-power transmissions of a voltage greater than the supported USB-PD voltages. A power circuit converts the high-power transmission to a charging voltage used to charge a battery system of the IHS. After the multimode AC adapter is unplugged from the IHS, power is drawing power from the battery system of the IHS. When the battery system drops below a low-voltage threshold, the power drawn from the battery system is routed to the same power circuit. While operating this low-voltage threshold, power is drawn from the battery system via the power circuit. When the battery system drops below a second low-voltage threshold, an off power state of the IHS is initiated.

17 Claims, 4 Drawing Sheets

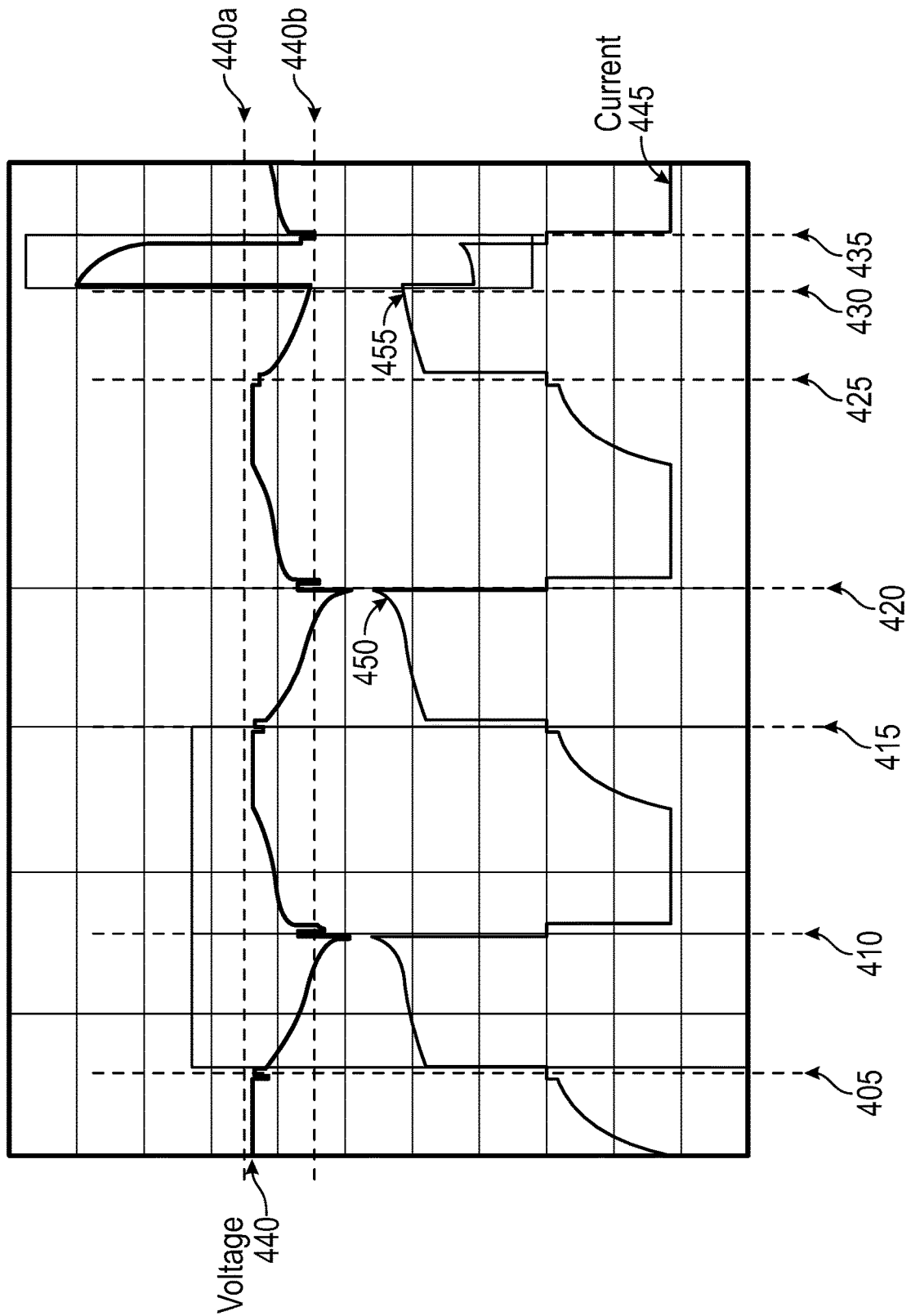

MULTIMODE USB-C POWER TRANSMISSION AND CONVERSION SUPPORTING IMPROVED BATTERY UTILIZATION

FIELD

This disclosure relates generally to Information Handling Systems (IHSs), and more specifically, to powering portable IHSs.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

Certain IHSs, such as laptops, tablets and mobile phones, are portable and are designed to operate using power supplied by rechargeable batteries. Power drawn from an electrical outlet may be used to charge the batteries of a portable IHS. Since the batteries of IHSs operate using DC (Direct Current) power, an AC adapter (i.e., AC/DC adapter or AC/DC converter) is required to convert the AC power from the wall outlet to DC power that can be used to charge the batteries. In some instances, AC adapters may provide DC power to an IHS via a cylindrical, barrel connector that couples with a corresponding DC power port receptable of the IHS. In some instances, DC power may be additionally or alternatively provided via a USB (Universal Serial Bus) coupling. The USB Power Delivery (USB-PD) Specification specifies communications between an AC adapter and an IHS that enable negotiation of various supply voltages that are supported by the AC adapter and that may be provided to the IHS via a USB port. The IHS utilizes the provided power in charging one or more rechargeable batteries of a battery system, from which the IHS powers the operations of the IHS. In many instances, a portion of the energy stored in a battery system is not useable by an IHS once the voltage output of the battery system drops into a low-voltage range.

SUMMARY

In various embodiments, methods are provided for powering an Information Handling System (IHS). The methods may include: receiving a high-power transmission from a multimode AC adapter, wherein the multimode AC adapter supports USB-PD transmission and also supports the high-power transmissions of a voltage greater than voltages of the supported USB-PD transmissions; charging a battery system of the IHS using an output of a power circuit that converts the high-power transmission to a charging voltage; drawing power from the battery system of the IHS; when the battery system drops below a low-voltage threshold, routing the power drawn from the battery system to the power circuit; drawing power from the battery system of the IHS via the power circuit; and when the battery system drops below a second low-voltage threshold, initiating an off power state of the IHS.

In additional method embodiments, the high-power transmission comprises a nominal voltage greater than 50 volts and a peak voltage not exceeding 60 volts. In additional method embodiments, routing the power drawn from the battery system to the power circuit increases the voltage of the power drawn from the battery system while operating below the low-voltage threshold. In additional method embodiments, routing the power drawn from the battery system to the power circuit decreases the current of the power drawn from the battery system while operating below the low-voltage threshold. In additional method embodiments, the power circuit comprises a plurality of digital voltage dividers operable for converting the high-power charging transmission to the charging voltage. In additional method embodiments, the power circuit comprises inductive and capacitive boost capabilities operable for converting power drawn from the battery system. In additional method embodiments, the second low-voltage threshold corresponds to a protection mode of the battery system. In additional method embodiments, routing the power drawn from the battery system to the power circuit reduces heat generated while operating below the low-voltage threshold.

In various additional embodiments, systems are provided for powering an Information Handling System (IHS). The systems may include: a multimode AC (Alternating Current) adapter; configured to supply power transmissions comprising USB-PD (Universal Serial Bus Power Delivery) transmissions and further comprising high-power transmissions of a voltage greater than voltages of the of USB-PD transmissions; and the IHS configured to: receive the high-power transmission from a multimode AC adapter; charge a battery system of the IHS using an output of a power circuit that converts the high-power transmission to a charging voltage; draw power from the battery system of the IHS; when the battery system drops below a low-voltage threshold, route the power drawn from the battery system to the power circuit; draw power from the battery system of the IHS via the power circuit; and when the battery system drops below a second low-voltage threshold, initiate an off power state of the IHS.

In additional system embodiments, the high-power charging transmission comprises a nominal voltage greater than 50 volts and a peak voltage not exceeding 60 volts. In additional system embodiments, routing the power drawn from the battery system to the power circuit increases the voltage of the power drawn from the battery system while operating below the low-voltage threshold. In additional system embodiments, routing the power drawn from the battery system to the power circuit decreases the current of the power drawn from the battery system while operating below the low-voltage threshold. In additional system embodiments, the second low-voltage threshold corresponds to a protection mode of the battery system. In additional system embodiments, the power circuit comprises a plurality of digital voltage dividers operable for converting the high-power charging transmission to the charging voltage, and wherein the power circuit further comprises inductive and capacitive boost capabilities operable for converting power drawn from the battery system. In additional system embodiments, routing the power drawn from the battery system to the power circuit reduces heat generated while operating below the low-voltage threshold.

In various additional embodiments, Information Handling Systems (IHSs) are provided power transmissions using a multimode AC adapter. The IHSs may include: one or more processors; a memory device coupled to the one or more processors, the memory device storing computer-readable instructions that, upon execution by the one or more processors, cause execution of an operating system of the IHS; a battery system; and an embedded controller comprising a memory having program instructions stored thereon that, upon execution by a logic unit of the embedded controller, cause the embedded controller to: receive a high-power transmission from a multimode AC adapter, wherein the multimode AC adapter supports USB-PD transmission and also supports the high-power transmissions of a voltage greater than voltages of the supported USB-PD transmissions; charge a battery system of the IHS using an output of a power circuit that converts the high-power transmission to a charging voltage; draw power from the battery system of the IHS; when the battery system drops below a low-voltage threshold, route the power drawn from the battery system to the power circuit; draw power from the battery system of the IHS via the power circuit; and when the battery system drops below a second low-voltage threshold, initiate an off power state of the IHS. In additional system embodiments, the high-power charging transmission comprises a nominal voltage greater than 50 volts and a peak voltage not exceeding 60 volts. In additional system embodiments, routing the power drawn from the battery system to the power circuit increases the voltage of the power drawn from the battery system while operating below the low-voltage threshold. In additional system embodiments, routing the power drawn from the battery system to the power circuit decreases the current of the power drawn from the battery system while operating below the low-voltage threshold. In additional system embodiments, the second low-voltage threshold corresponds to a protection mode of the battery system.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

FIG. 4 is a graph diagram illustrating certain aspects of the operation of a system configured according to various embodiments for providing multimode power conversion in support of improved battery utilization.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources, such as a Central Processing Unit (CPU) or hardware or software control logic, Read-Only Memory (ROM), and/or other types of nonvolatile memory.

Figure 1:
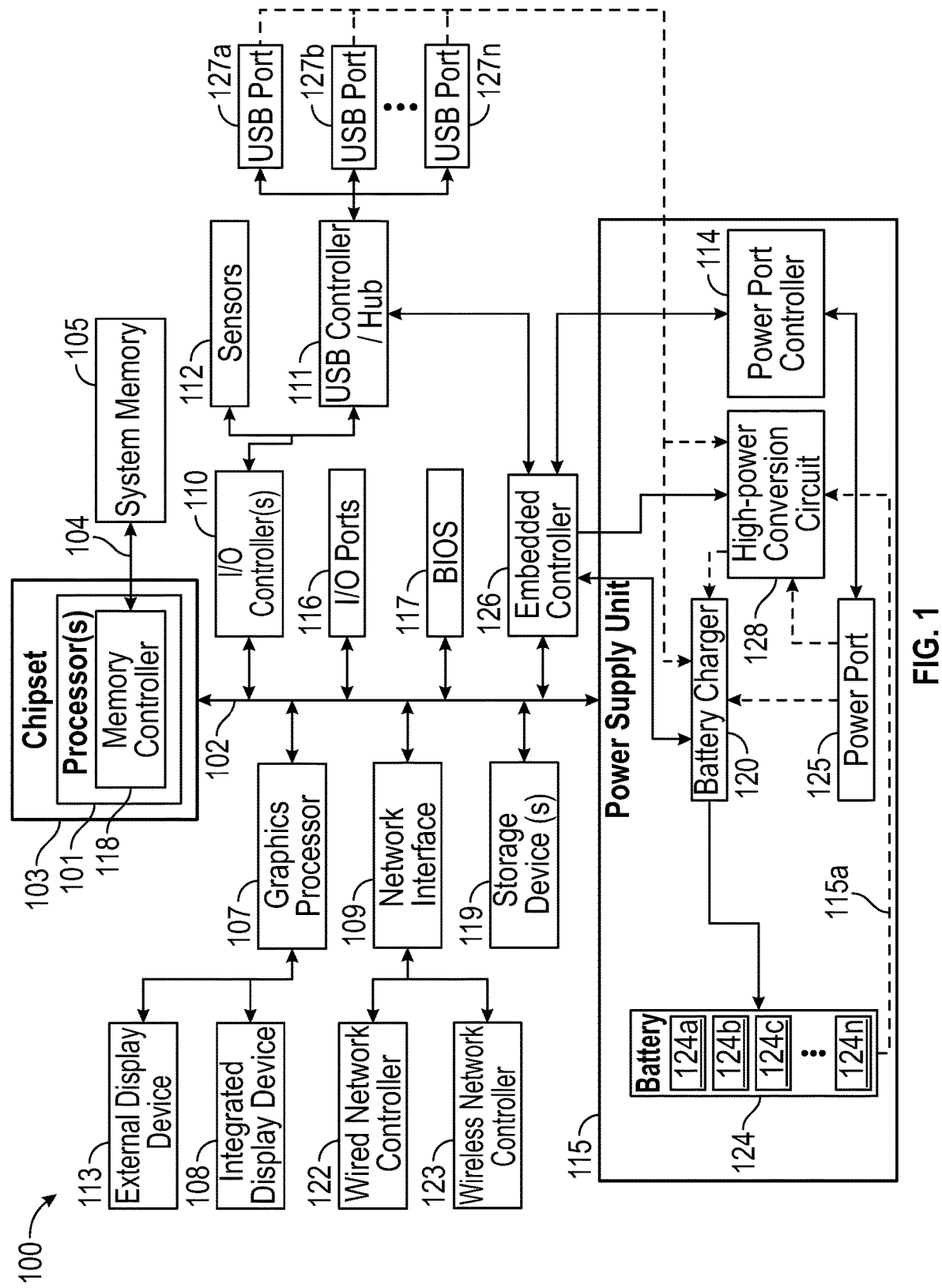
FIG. 1 is a block diagram depicting certain components of an IHS operable according to various embodiments for multimode power conversion in support of improved battery utilization.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. FIG. 1 shows an example of an IHS configured to implement the systems and methods described herein according to certain embodiments. It should be appreciated that although certain IHS embodiments described herein may be discussed in the context of a personal computing device, other embodiments may be utilized.

As described, certain portable IHSs may utilize AC adapters for providing power from an electrical outlet that is converted to a DC output that is used in powering a portable IHS and/or recharging internal batteries of a portable IHS. As IHSs become thinner, and thus more portable, it is preferable that the AC adapters used for charging portable IHSs also remain as thin and as portable as possible. The adoption of thinner charging connectors promotes thin portable IHSs and thin AC adapters. For instance, USB-C connectors may support providing an IHS with charging inputs and may be considerably thinner than USB Type A connectors, as well as being thinner than the cylindrical barrel connectors that are commonly supported by IHS power ports.

While IHSs become increasingly thinner and more portable, the power requirements for portable IHSs are not necessarily decreasing. As described with regard to FIG. 1, certain portable IHSs such as laptops may include multi-core processors, a separate graphics processor, significant amounts of memory, persistent storage drives, specialized microcontrollers and one or more integrated displays. Such high performance portable IHSs may have significant power demands, in some cases greater than 200 watts. In some instances, portable IHSs may have power demands as high as 250 watts. In many instances, portable IHSs may also be expected to serve as a source of power for external devices coupled to the portable IHS. USB-C power adapters utilize thin cabling that limits power transmissions to 5 amps. Since charging voltages specified by USB-PD protocols are limited to 20 volts, existing USB-C power adapters are limited to providing less than 100 watts of power.

In order to be classified as NEC (National Electrical Code) Class 2 or Class 3 power supply units, the output of a power supply must be less than 60 volts. Power supplies with voltage outputs greater than 60 volts may be considered to pose a risk of fire or electric shock and may thus be subject to additional circuit protection requirements. Accordingly, embodiments provide support for AC power adapters capable of transmitting output voltages up to 60 volts that may be used to provide upwards of 200 watts of power to IHSs. As described in additional detail below, embodiments may support transmission of supply voltages up to 60 volts via USB-C couplings and may convert the transmitted supply voltage to high-power charging outputs greater than 200 watts through the use of a high-efficiency, high-power conversion circuit of the IHS. Power adapters according to embodiments that support transmission of supply voltages up to 60 volts may be USB-C power adapters that utilize the various pins supported by USB-C connectors to support use of data lines and power supply lines between an IHS and a coupled device. Using these USB-C couplings, the power supply lines may support bi-directional charge transfer where the IHS may either be supplied with power or may serve as a source of power. Using the high-power conversion circuit of IHS embodiments, USB-C power adapter may support transmission of voltages of up to 60 volts, as well as transmission of supply voltages supported by the USB-PD specifications (e.g., 5V, 9V, 15V, 20V), thus providing multimode charging outputs.

The power supplied via an AC adapter may be used to charge the internal batteries of an IHS. Once the AC adapter is unplugged, power is drawn from the batteries for use in powering the operations of the IHS and, in some cases, to provide power to external devices coupled to the IHS. In many instances, however, not all of the power stored within the battery system can be efficiently utilized. As a battery reaches a low-voltage condition, generating a constant supply of power results in increased currents in the power circuit and traces used to delivery power from the battery. In order to continue to draw power from a battery in a low-voltage condition, the power circuit and power delivery traces must be designed to account for delivery of power at high currents. In some instances, supporting high-power operations of an IHS from a low-voltage battery system may result in currents greater than 15 amps in the power circuit. As described in additional detail below, embodiments support drawing power from a low-voltage battery system through operation of a high-power conversion circuit also used to support high-power transmissions from a multimode AC adapter.

FIG. 1 is a block diagram depicting certain components of an IHS 100 operable according to various embodiments for multimode power conversion in support of improved battery utilization. A multimode power adapter may provide IHS 100 with high-power transmissions via a USB-C coupling, such as power transmissions exceeding 200 watts, while also supporting USB-PD power transmissions. As described in additional detail below, IHS 100 may utilize a high-power conversion circuit 128 for use in efficiently converting the supply high-power transmission to a voltage suitable for use by the IHS. Also as described in additional detail below, embodiments may additionally utilize this high-power conversion circuit 128 when drawing power from battery system 124 in order to improve the utilization of the energy stored in the battery system and to reduce the need to utilize high-currents when drawing power from battery system 124 during low-voltage conditions. In various embodiments, IHS 100 may include an embedded controller 126 that includes logic that executes program instructions, in conjunction with operations by components of power supply unit 115 and USB controller 111, to perform the operations disclosed herein for configuring multimode USB-C power transmission and conversion. While a single IHS 100 is illustrated in FIG. 1, IHS 100 may be a component of an enterprise system that may include any number of additional IHSs that may also be configured in the same or similar manner to IHS 100.

IHS 100 includes one or more processors 101, such as a Central Processing Unit (CPU), that execute code retrieved from a system memory 105. Although IHS 100 is illustrated with a single processor 101, other embodiments may include two or more processors, that may each be configured identically, or to provide specialized processing functions. Processor 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, the processor 101 includes an integrated memory controller 118 that may be implemented directly within the circuitry of the processor 101, or the memory controller 118 may be a separate integrated circuit that is located on the same die as the processor 101. The memory controller 118 may be configured to manage the transfer of data to and from the system memory 105 of the IHS 100 via a high-speed memory interface 104.

The system memory 105 that is coupled to processor 101 provides the processor 101 with a high-speed memory that may be used in the execution of computer program instructions by the processor 101. Accordingly, system memory 105 may include memory components, such as such as static RAM (SRAM), dynamic RAM (DRAM), NAND Flash memory, suitable for supporting high-speed memory operations by the processor 101. In certain embodiments, system memory 105 may combine both persistent, non-volatile memory and volatile memory. In certain embodiments, the system memory 105 may be comprised of multiple removable memory modules.

IHS 100 utilizes a chipset 103 that may include one or more integrated circuits that are connect to processor 101. In the embodiment of FIG. 1, processor 101 is depicted as a component of chipset 103. In other embodiments, all of chipset 103, or portions of chipset 103 may be implemented directly within the integrated circuitry of the processor 101. Chipset 103 provides the processor(s) 101 with access to a variety of resources accessible via bus 102. In IHS 100, bus 102 is illustrated as a single element. Various embodiments may utilize any number of buses to provide the illustrated pathways served by bus 102.

As illustrated, a variety of resources may be coupled to the processor(s) 101 of the IHS 100 through the chipset 103. For instance, chipset 103 may be coupled to a network interface 109 that may support different types of network connectivity. In certain embodiments, IHS 100 may include one or more Network Interface Controllers (NICs), each of which may implement the hardware required for communicating via a specific networking technology, such as Wi-Fi, BLUETOOTH, Ethernet and mobile cellular networks (e.g., CDMA, TDMA, LTE). As illustrated, network interface 109 may support network connections by wired network controllers 122 and wireless network controller 123. Each network controller 122, 123 may be coupled via various buses to the chipset 103 of IHS 100 in supporting different types of network connectivity, such as the network connectivity utilized by applications of the operating system of IHS 100.

Chipset 103 may also provide access to one or more display device(s) 108, 113 via graphics processor 107. In certain embodiments, graphics processor 107 may be comprised within a video or graphics card or within an embedded controller installed within IHS 100. In certain embodiments, graphics processor 107 may be integrated within processor 101, such as a component of a system-on-chip. Graphics processor 107 may generate display information and provide the generated information to one or more display device(s) 108, 113 coupled to the IHS 100. The one or more display devices 108, 113 coupled to IHS 100 may utilize LCD, LED, OLED, or other display technologies. Each display device 108, 113 may be capable of receiving touch inputs such as via a touch controller that may be an embedded component of the display device 108, 113 or graphics processor 107, or may be a separate component of IHS 100 accessed via bus 102. As illustrated, IHS 100 may support an integrated display device 108, such as a display integrated into a laptop, tablet, 2-in-1 convertible device, or mobile device. In some embodiments, IHS 100 may be a hybrid laptop computer that includes dual integrated displays incorporated in both of the laptop panels. IHS 100 may also support use of one or more external displays 113, such as external monitors that may be coupled to IHS 100 via various types of couplings.

In certain embodiments, chipset 103 may utilize one or more I/O controllers 110 that may each support hardware components such as user I/O devices 111 and sensors 112. For instance, I/O controller 110 may provide access to one or more user I/O devices 110 such as a keyboard, mouse, touchpad, touchscreen, microphone, speakers, camera and other input and output devices that may be coupled to IHS 100. Each of the supported user I/O devices 111 may interface with the I/O controller 110 through wired or wireless connections. In certain embodiments, sensors 112 accessed via I/O controllers 110 may provide access to data describing environmental and operating conditions of IHS 100. For instance, sensors 112 may include geo-location sensors capable for providing a geographic location for IHS 100, such as a GPS sensor or other location sensors configured to determine the location of IHS 100 based on triangulation and network information. Various additional sensors, such as optical, infrared and sonar sensors, that may provide support for xR (virtual, augmented, mixed reality) sessions hosted by the IHS 100.

As illustrated, I/O controllers 110 may include a USB controller 111 that, in some embodiments, may also implement functions of a USB hub. In some embodiments, USB controller 111 may be a dedicated microcontroller that is coupled to the motherboard of IHS 100. In other embodiments, USB controller 111 may be implemented as a function of another component, such as a component of a SoC of IHS 100, embedded controller 126, processors 101 or of an operating system of IHS 100. USB controller 111 supports communications between IHS 100 and one or more USB devices coupled to IHS 100, whether the USB devices may be coupled to IHS 100 via wired or wireless connections. In some embodiments, a USB controller 111 may operate one or more USB drivers that detect the coupling of USB devices and/or power inputs to USB ports 127a-n. USB controller 111 may include drivers that implement functions for supporting communications between IHS 100 and coupled USB devices, where the USB drivers may support communications according to various USB protocols (e.g., USB 2.0, USB 3.0). In providing functions of a hub, USB controller 111 may support concurrent couplings by multiple USB devices via one or more USB ports 127a-n supported by IHS 100.

In some embodiments, USB controller 111 may control the distribution of both data and power transmitted via USB ports 127a-n. For instance, USB controller 111 may support data communications with USB devices that are coupled to the USB ports 127a-n according to data communication protocols set forth by USB standards. The power transmissions supported by USB controller 111 may include incoming charging inputs received via USB ports 127a-n, as well as outgoing power outputs that are transmitted from IHS 100 to USB devices that are coupled to USB ports 127a-n. In some embodiments, USB controller 111 may interoperate with embedded controller 126 in routing power inputs received via USB ports 127a-n to a battery charger 120 supported by the power supply unit 115 of IHS 100. USB controller 111 may negotiate the transmission of power inputs received via USB ports 127a-n, where these power inputs may include USB-PD power inputs, as well as high-power inputs of up to 60 volts. Using a high-power conversion circuit 126, the power supply unit 115 may convert received supply inputs of up to 60 volts to voltages (e.g., 18-20 volts) suitable for use in rapidly charging the internal batteries 124 of IHS 100, supporting high-power operations of IHS 100 and/or serving as a power source for external devices that are coupled to a USB port 127a-n of IHS 100. In some scenarios, the operation of power conversion circuit 112 may support power transfers that support high-power operations of the IHS, while still providing sufficient power to also continue in providing power to external devices coupled to a USB port 127an-n of IHS 100. As described in additional detail below, in scenarios where a multimode USB-C adapter according to embodiments is detected as being coupled to one of the USB ports 127a-n, USB controller 111 may receive inputs from embedded controller 126 that direct power received at USB ports 127a-n to be routed to a high-power conversion circuit 128.

Other components of IHS 100 may include one or more I/O ports 116 that support removeable couplings with various types of peripheral external devices. I/O ports 116 may include various types of ports and couplings that support connections with external devices and systems, either through temporary couplings via ports, such as HDMI ports, accessible to a user via the enclosure of the IHS 100, or through more permanent couplings via expansion slots provided via the motherboard or via an expansion card of IHS 100, such as PCIe slots.

Chipset 103 also provides processor 101 with access to one or more storage devices 119. In various embodiments, storage device 119 may be integral to the IHS 100, or may be external to the IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud drive accessible via network interface 109.

As illustrated, IHS 100 also includes a BIOS (Basic Input/Output System) 117 that may be stored in a non-volatile memory accessible by chipset 103 via bus 102. In some embodiments, BIOS 117 may be implemented using a dedicated microcontroller coupled to the motherboard of IHS 100. In some embodiments, BIOS 117 may be implemented as operations of embedded controller 126. Upon powering or restarting IHS 100, processor(s) 101 may utilize BIOS 117 instructions to initialize and test hardware components coupled to the IHS 100. The BIOS 117 instructions may also load an operating system for use by the IHS 100. The BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

Some IHS 100 embodiments may utilize an embedded controller 126 that may be a motherboard component of IHS 100 and may include one or more logic units. In certain embodiments, embedded controller 126 may operate from a separate power plane from the main processors 101, and thus from the operating system functions of IHS 100. In some embodiments, firmware instructions utilized by embedded controller 126 may be used to operate a secure execution environment that may include operations for providing various core functions of IHS 100, such as power management and management of certain operating modes of IHS 100.

Embedded controller 126 may also implement operations for interfacing with a power supply unit 115 in managing power for IHS 100. In certain instances, the operations of embedded controller may determine the power status of IHS 100, such as whether IHS 100 is operating strictly from battery power, whether any charging inputs are being received by power supply unit 115, and/or the appropriate mode for charging the one or more battery cells 124a-n using the available charging inputs. Embedded controller 126 may support routing and use of power inputs received via a USB port 127a-n and/or via a power port 125 supported by the power supply unit 115. In addition, operations of embedded controller 126 may provide battery status information, such as the current charge level of the cells 124a-n of battery 124.

Embedded controller 126 may implement operations for utilizing the capabilities of the high-power conversion circuit 128 in supporting improved utilization of the power stored by battery system 124 of IHS 100. In particular, embedded controller 126 may interface with power supply unit 115 in monitoring the battery state, such as the voltage level, of battery 124. As described in additional detail with regard to FIGS. 3 and 4, when the voltage stored in battery 124 drops below a low-voltage threshold, continuing to draw a constant supply of power from the battery results in high currents in the drawn power. In low-voltage battery conditions, drawing power at high currents becomes prohibitive with regards to the resulting heat in the power circuits of the power supply unit 115 and with regard to the feasible current-carrying capacity of the power circuit of an IHS. Accordingly, when operating from power stored in battery system 124, embedded controller 126 may detect when the voltage of the battery system 124 drops below a low-voltage threshold. In some embodiments, battery system 124 may include logic configured to monitor available voltage and to notify embedded controller 126 when this available voltage drops below a low-voltage threshold. In such embodiments, battery system 124 may be configured to report additional battery state information to embedded controller 126 for use in determining when to utilize the high-power conversion circuit.

At the low-voltage threshold of available battery power, embedded controller 126 may route the output of battery 124 to the high-power conversion circuit 128 via pathway 115a. As described in additional detail with regard to FIGS. 3 and 4, the resulting increase in voltage in the power drawn from battery 124 also results in lower currents in the power circuits and power delivery traces during low-voltage battery conditions. When the charge level of battery 124 drops below a second low-voltage threshold, embedded controller 126 may transition the IHS to an off-power state in implementing a battery protection mode that preserves a minimal power level in battery 124.

In management of operating modes of IHS 100, embedded controller 126 may implement operations for detecting certain changes to the physical configuration of IHS 100 and managing the modes corresponding to different physical configurations of IHS 100. For instance, where IHS 100 is a laptop computer or a convertible laptop computer, embedded controller 126 may receive inputs from a lid position sensor that may detect whether the two sides of the laptop have been latched together to a closed position. In response to lid position sensor detecting latching of the lid of IHS 100, embedded controller 126 may initiate operations for shutting down IHS 100 or placing IHS 100 in a low-power mode.

In this manner, IHS 100 may support the use of various power modes. In some embodiments, the power modes of IHS 100 may be implemented through operations of the embedded controller 126 and power supply unit 115. In various embodiments, a mobile IHS 100 may support various low power modes in order to reduce power consumption and/or conserve power stored in battery 124 when mobile IHS 100 is not actively in use. The power modes may include a fully on state in which all, or substantially all, available components of mobile IHS 100 may be fully powered and operational. In a fully off power mode, processor(s) 101 may powered off, any integrated storage devices 119 may be powered off, and/or integrated displays 108 may be powered off. In an intermediate low-power mode, various components of mobile IHS 100 may be powered down, but mobile IHS 100 remains ready for near-immediate use. In a standby power mode, which may be referred to as a sleep state or hibernation state, state information may be stored to storage devices 119 and all but a selected set of components and low-power functions of mobile IHS 100, such as standby functions supported by embedded controller 126, are shut down.

As described, IHS 100 may also include a power supply unit 115 that receives power inputs used for charging batteries 124 from which the IHS 100 operates. IHS 100 may include a power port 125 to which an AC adapter may be coupled to provide IHS 100 with a DC supply of power. The DC power input received at power port 125 may be utilized by a battery charger 120 for recharging one or more internal batteries 124 of IHS 100. As illustrated, batteries 124 utilized by IHS 100 may include one or more cells 124a-n that may connected in series or in parallel. Power supply unit 115 may support various modes for charging the cells 124a-n of battery 124 based on the power supply available to IHS 100 and the charge levels of the battery system 124.

In certain embodiments, power supply unit 115 of IHS 100 may include a power port controller 114 that is operable for configuring operations by power port 125. In certain embodiments, power port controller 114 may be an embedded controller that is a motherboard component of IHS 100, a function supported by a power supply unit 115 embedded controller, or a function supported by a system-on-chip implemented by processors 101. In some embodiments, power port controller 114 may exchange communications, such as PSID (Power Supply Identifier) signals, with a multimode AC adapter coupled to power port 125 in identifying the adapter and negotiating its output. As described in additional detail regard to the below embodiments, in scenarios where a high-power supply is detected as being coupled to power port 125, power port controller 114 may receive inputs from embedded controller 126 directing the power supply input received at power port 125 to be routed to a high-power conversion circuit 128.

Using the high-power conversion circuit 128, the power supply unit 115 converts received supply inputs of up to 60 volts to a voltage (e.g., 18-20 volts) suitable for use in charging the internal battery system 124 of IHS 100, directly powering the operations of IHS 100 and/or providing power to external devices coupled to IHS 100. In scenarios where the supply voltage is being provided via a USB-C port 127a-n, USB-C power cords may be limited to transmitting 5 amps of current. In such instances, the high-power conversion circuit 128 may convert received 5-amp supply inputs of up to 60 volts to a power supply of approximately 18 volts/12 amps that is usable by IHS 100. In this manner, high power conversion circuit 128 may support use of USB-C couplings for transmission of power at voltages up to 60 volts and conversion of the supply voltage in a manner that supports power requirements above 200 watts, in some cases above 250 watts.

In some embodiments, high-power conversion circuit 128 may be implemented using a buck converter that includes a set of digital voltage dividers (i.e., digital potentiometers) that may be driven at high frequencies (e.g., 10 MHz) in order to support high-efficiency voltage conversion. In some embodiments, the digital voltage dividers of the high-power conversion circuit 128 may be configured for being driven at high frequencies via the use of switching elements that utilize a GaAs semiconductor, as the inventors have recognized this configuration provides efficiency improvements over existing power supply techniques used to deliver power in the range of 60 volts. Existing buck converters that are utilized to support IHS power supplies operate using analog, capacitive voltage dividers. When converting a 54-volt input to an 18-volt output using such existing capacitive buck converters, conversion efficiencies are typically around 88%, thus generating up to 25 watts of heat. By utilizing digital voltage dividers driven at high frequencies, up to 98% conversion efficiencies may be obtained. Through such high efficiency conversion, heat dissipation remains manageable at approximately 5 watts. In some embodiments, high-power conversion circuit 128 may be a buck-boost converter, where the buck operations utilize digital voltage dividers and boost operations may be implemented using capacitive or inductive converters. As described in additional detail with regard to FIG. 2B, in embodiments where high-power conversion circuit 128 includes buck and boost capabilities, a multimode AC adapter according to embodiments may include the same high-power conversion circuit 128 that utilizes the converter's boost capabilities to efficiently generate outputs of up to 60 volts for transmission to IHS 100, where the circuit's buck capabilities are used to efficiently convert the supply to a voltage suitable for use by the IHS. As described in additional detail with regard to FIGS. 3 and 4, this same boost capabilities of a high-power conversion circuit 128 used by a multimode AC adapter may also be used to support efficient use of power from batteries in low-voltage conditions.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as a systems-on-a-chip.

Figure 2A:
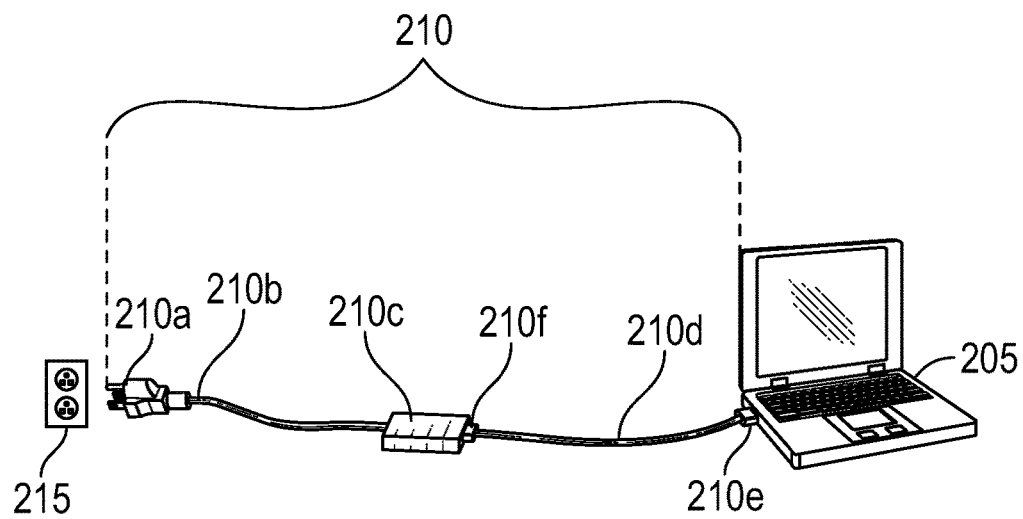
FIG. 2A is a diagram depicting certain components of a multimode USB-C power supply system, according to various embodiments, that includes an AC adapter coupled to an IHS that is a laptop computer.

FIG. 2A is a diagram depicting components of a multimode power system according to various embodiments, where that system includes a multimode AC power adapter 210 coupled to an IHS that is a laptop computer 205. Multimode AC adapter 210 may be capable of providing supply voltages to laptop 205 that may include standard USB-PD output voltages, as well as high-power output voltages of up to 60 volts. Power provided by AC power adapter 210 may be used to charge the internal batteries of laptop computer 205 using power supplied via a power port or via a USB-C port of laptop 205. Via these supported power supply modes, multimode AC power adapter 210 may be used to charge the batteries of various types of portable IHSs, such as tablets, 2-1 laptops, convertible laptops, smartphones, smart watches, cameras, toys, gaming accessories, and various other types of devices. Embodiments may be implemented using all varieties of IHSs that operate on DC power supplied using rechargeable batteries and that charge these batteries using DC power converted by an AC adapter 210.

A multimode AC power adapter 210 according to embodiments may include several connected components that operate to draw AC power from an electrical outlet 215 and convert the AC power to a DC output for delivery to an IHS, such as the laptop 205 of FIG. 2. One end of the AC power adapter 210 includes an AC plug 210a that includes prongs that may be inserted into slots provided by an AC electrical outlet 215. Many different types of AC plugs 210a are utilized throughout the world, with different plugs from different regions utilizing different numbers, shapes and orientations of the prongs that conform to the electrical outlets used in a region. In North America, most general-purpose electrical outlets deliver 120 V of AC at a frequency of 60 hertz.

As illustrated, an AC electrical cord 210b of multimode AC adapter 210 connects AC plug 210a to multimode converter 210c. In many embodiments, AC electrical cord 210b may be removeable from converter 210c. Embodiments may also include AC electrical cords 210b that are fixed to converter 210c. A function of a multimode converter 210c is to convert the AC received from power cord 210b to a DC output that can be used to power IHSs that are compatible with the AC adapter 210. In certain instances, converter 210c may be referred to as a power brick. In some embodiments, multimode converter 210c may generate outputs in accordance with USB-PD protocols and may also generate high-power outputs that exceed the maximum 20 volts outputs of USB-PD, such as outputs up to 60 volts. In this manner, a multimode converter 210c may support multiple output supply modes, thus providing support for providing power to a range of IHSs, including IHSs such as high-power laptop computers. In some scenarios, the ability to efficiently support high-power supply modes allows high-power operations of the IHS 205 to be supported while still providing sufficient additional power to serve as a power source for devices coupled to IHS 205.

In some embodiments, the multimode AC power adapter may support a nominal high-power charging transmission of 54 volts, thus allowing for 10 percent fluctuations in the actual charging output while still maintaining outputs below 60 volts. Typical embodiments may support other nominal charging supply voltages between 50 volts and 60 volts depending on the anticipated fluctuations in the actual charging input. Many embodiments may support nominal supply voltages ranging from 54 volts to 56 volts. Some embodiments may be configured to support charging supply voltages significantly below 50 volts.

In supporting of these multiple output supply modes, converter 210c may support identification of the multimode AC adapter 210 to the coupled IHS, where this identification information may be utilized in configuring the DC power output generated by converter 210c and transmitted to IHS 205. Converter 210c may also support capabilities for negotiating with IHS 205 to determine the parameters of the DC output supply voltage generated by converter 210c. The DC output generated by converter 210c is provided to laptop 205 via a DC power cord 210d that supplies the DC output via a connector that is received by a port of the laptop.

DC cord 210d includes a DC plug 210f that may be received by a port of converter 210c. In the illustrated embodiment, the DC plug 210f is a USB-C connector that is received by a USB-C port of converter 210c. The DC plug 210e on the opposite end of DC cord 210d may be an identical to DC plug 210f and may thus also be a USB-C connector that is received by a USB-C port 205b of IHS 205. In such embodiments, DC cord 210d may be a reversible USB-C cable with USB-C connectors on each end. In some embodiments, multimode AC adapter 210 may also support use of a DC cord 210d that, instead of USB-C connectors, includes a barrel connector for DC plug 210f that is received by a corresponding power port of converter 210c and also includes a barrel connector for DC plug 210e that is received by a power port 205a of IHS 205. In some embodiments, a DC cord 210d utilizing barrel connector DC plugs 210e and 210f may be reversible. In some embodiments, converter 210c may include both one or more USB-C ports and a barrel connector power port, thus supporting two types of removeable DC cords 210d. In some embodiments, converter 210c may support a single fixed DC cord 210d that may be a USB-C cord or a DC power code utilizing a barrel connector. As described, embodiments may support the transmission of power at voltages up to 60 volts, while adhering to the 5-amp limitation on some USB-C cords 210d. The high-power conversion circuit of IHS 205 may then be used to efficiently convert the transmitted power to a usable voltage in a manner that may provide over 200 watts of power to IHS 205. Through use of the high-power conversion circuit, high-power IHSs may be supported using thin USB-C cords 210d, thus promoting the use of thinner and more portable multimode AC adapters 210 for use by a large range of IHSs, including IHSs capable of utilizing more than 200 watts of power, and in some cases up to 250 watts of power. In addition, the efficient conversion provided by the high-power conversion circuit supports the use of thinner barrel connectors and thinner cabling for DC cords that are received by the power port of the IHS. As described, IHSs continue to get thinner and more portable. In some IHSs, the IHS power port that receives a cylindrical barrel connector is one of the thickest components of the IHS. By supporting thinner barrel connectors, the diameter of the power ports supported IHSs can also be reduced, thus providing an opportunity to make IHSs still thinner.

Figure 2B:
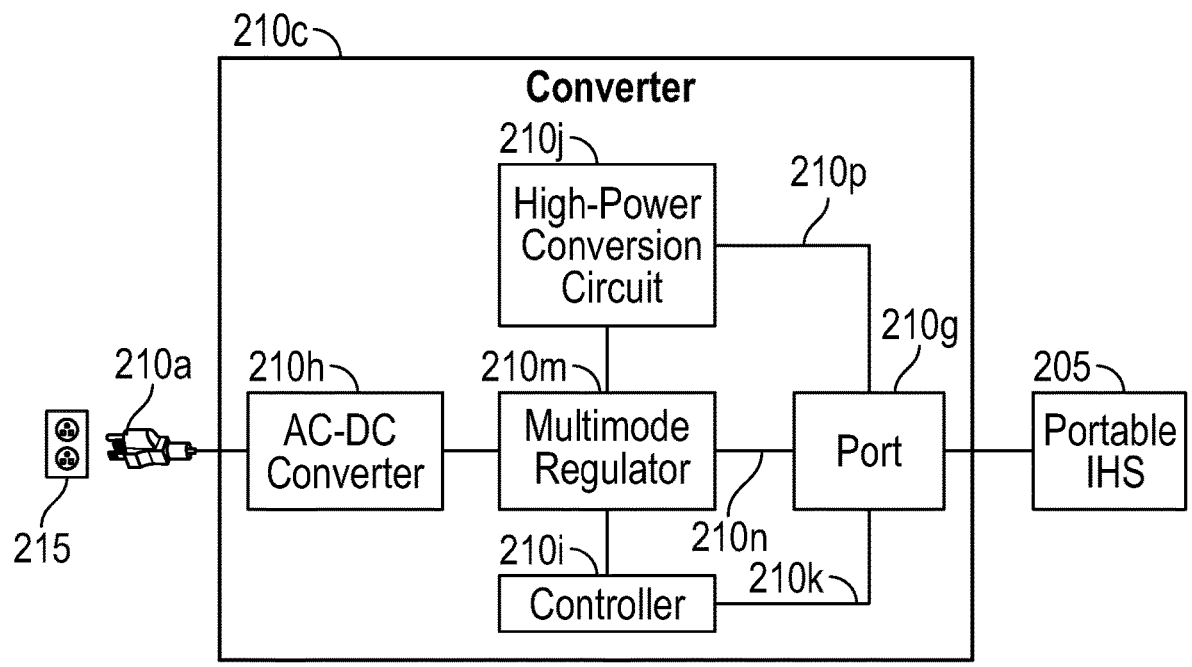
FIG. 2B is a diagram depicting certain additional components of a multimode power supply system, according to various embodiments, that includes an AC adapter that is coupled to an IHS.

FIG. 2B is a diagram depicting additional components of a multimode power system according to various embodiments, where the system includes a multimode converter 210c of AC power adapter coupled to an IHS 205. In FIG. 2B, certain of the internal components of a multimode converter 2101c, according to some embodiments, are illustrated. Multimode converter 210c receives AC power drawn from AC outlet 215 and provides portable IHS 205 with a supply of DC power. Multimode converter 210c may utilize an AC/DC converter 210h that receives the AC power and generates a supply of DC power that may be supplied to a multimode regulator 210m. Based on configurations provided by a controller 210i of the converter 210c, multimode regulator 210m may supply a regulated supply of DC power to a power port 210g of the converter or to a high-power conversion circuit 210j.

As described, in some embodiments, converter 210c may be coupled to mobile IHS 205 via a USB-C cable. Other embodiments may utilize a DC cable that couples to IHS 205 via a barrel connector coupling. The DC cabling, whether USB-C or a DC barrel connector cabling, may be received by a port 210g of the converter. The DC cable may be removable from port 210g, or may be fixed to port 210g. In some embodiments, converter 210c may include separate USB-C and DC barrel connector ports that may operate in the manner described for port 210g. Upon the AC converter being coupled to IHS 205, converter 210c and IHS 205 may initiate handshake procedures for identifying the capabilities of the AC adapter and in negotiating an output of converter 210c.

In USB-C embodiments, controller 210i of converter 210c and a USB controller of IHS 205, such as USB controller 111 of FIG. 1, may initiate USB-PD communications via a data pin of the USB-C coupling in determining the USB-PD outputs supported by converter 210c and in negotiating a USB-PD output (e.g., 5V, 9V, 15V, 20V) to be supplied to IHS 205 by converter 210c. Additionally, embodiments may supplement these USB-PD communications with additional communications conducted between controller 210i and the USB controller of IHS 205 via a data pin of the USB-C coupling. These additional communications may identify converter 210c as being a multimode converter capable of providing high-power outputs of up to 60 volts. The additional communications may also support negotiating a particular supply output by converter 210c. In some embodiments, these additional communications for supporting high-power operations may be PSID signals that are transmitted along data pins of the USB-C coupling.

In embodiments that utilize a DC coupling with a barrel connector, a similar negotiation may be conducted between controller 210i of converter 210c and a power port controller of IHS 205, such as power port controller 114 of FIG. 1. In such embodiments, controller 210i and the power port controller of IHS 205 may exchange PSID messages via a data line included in the DC cabling. The exchanged PSID messages may identify converter 210c as a multimode converter capable of generating high-power outputs, as well as specifying ordinary power outputs that are supported by the converter. Additional PSID messages may be exchanged that negotiate a supply output by converter 210c.

As indicated in FIG. 2B, controller 210i may utilize a data pathway 210k in receiving data line communications received by port 210g, whether the port is a USB-C port that transmits USB data pin communications or whether port 210g is a DC port relaying on PSID communications. Based on such data communications, controller 210i may specify the capabilities of converter 210c to IHS 205 and may negotiate the output to be supplied by converter 210c. Once the supply output of converter 210c has been negotiated, controller 210i may configure multimode regulator 210m for generating the negotiated output. In some instances, port 210g may be a USB-C power cord and controller 210i may negotiate a USB-PD output by converter 210c. In such instances, controller 210i may configure multimode regulator 210m to deliver a USB-PD output, via power pathway 210n, to port 210g. In other instances, controller 210i may negotiate a high-power output by converter 210c. In such instances, controller 210i may configure multimode regulator 210m to route its output to high-power conversion circuit 210j for generating a high-power output of a voltage up to 60 volts and delivering greater than 200 watts of power.

As described with regard to FIG. 1, a high-power conversion circuit 128 may be utilized by an IHS 100 to efficiently convert high-power supply inputs of up to 60 volts to a voltage (e.g., 18-20 volts) suitable of use by IHS 100. In some embodiments, the high-power conversion circuit 128 of IHS 100 may be a buck-boost converter that may include capacitive and/or inductive boost capabilities. In some embodiments, the boost capabilities of this same buck-boost, high-power conversion circuit 210j may be utilized by multimode AC converter 210c in efficiently generating high-power supply outputs. In such embodiments, the same conversion circuit may be utilized by both the power supply unit of IHS 205 and the AC converter 210c. In some embodiments, boost capabilities of a high-power conversion circuit 210j may be implemented using capacitive elements, such as switched capacitors that may be driven at high frequencies in order to provide high-efficiency conversions with as little as 2% loss. Such capacitive conversion elements provide efficient conversions but are capable of supporting only a limited number of conversion ratios, thus limiting the use of capacitive elements to use in converting a certain set of input and output voltages. Some embodiments may additionally or alternatively implement boost capabilities using inductive elements, thus operating at reduced efficiencies, but providing the ability to support a wider range or conversions. In some embodiments, the high-power conversion circuit 210j included in multimode AC converter 210c may include only boost converter capabilities, and may thus provide complimentary capabilities to a buck converter or buck-boost high-power conversion circuit 128 in the coupled IHS 205.

As described with regard to the high-power conversion circuit of FIG. 1, existing conversion circuits typically utilize analog voltage dividers in converting received supply voltages to a voltage for use by the battery charging system. Embodiments may utilize a series of digital voltage dividers that generate significantly less heat than analog voltage dividers in performing such conversions. For instance, the embedded controller may negotiate a 54-volt transmission by a multimode AC adapter, which may be converted to an 18 volt output using cascading digital voltage dividers of the high-power conversion circuit. Implementing this particular conversion using existing analog voltage dividers may require three or more analog voltage dividing circuits, thus resulting in conversion efficiencies of approximately 88 percent. Such levels of inefficiency not only result in wasted power, but also may generate up to 25 watts of heat within the IHS conversion circuit. Digital voltage divider conversion may result in efficiencies approaching 98 percent, thus resulting in a loss of approximately 5 watts. In some embodiments, the embedded controller may negotiate a lower supply voltage, such as 36-volts, with the multimode AC adapter, thus requiring use of only a single digital voltage divider by the high-power conversion circuit to reach an 18-volt output, while generating even less heat.

In some embodiments, the boost capabilities of the high-power conversion circuit may be similarly configured to efficiently generate various outputs, such as for use in support of improved battery utilization. For instance, when drawing power from a battery in a low-voltage scenario the number and/or type of multiplication circuits configured for use within a boost capability of the high-power conversion circuit may be selected based on the available battery voltage, the voltage of the supply needed to support IHS operations and/or the current levels that would result from a particular multiplication. For instance, embodiments may utilize a capacitive voltage multiplication that doubles the output voltage during a first phase of the voltage battery condition, but as voltage drops further switching to use of an inducive voltage multiplication capability in order generate a fractional voltage multiplication that will result in use of all available battery power until a protection mode has been reached.

Figure 3:
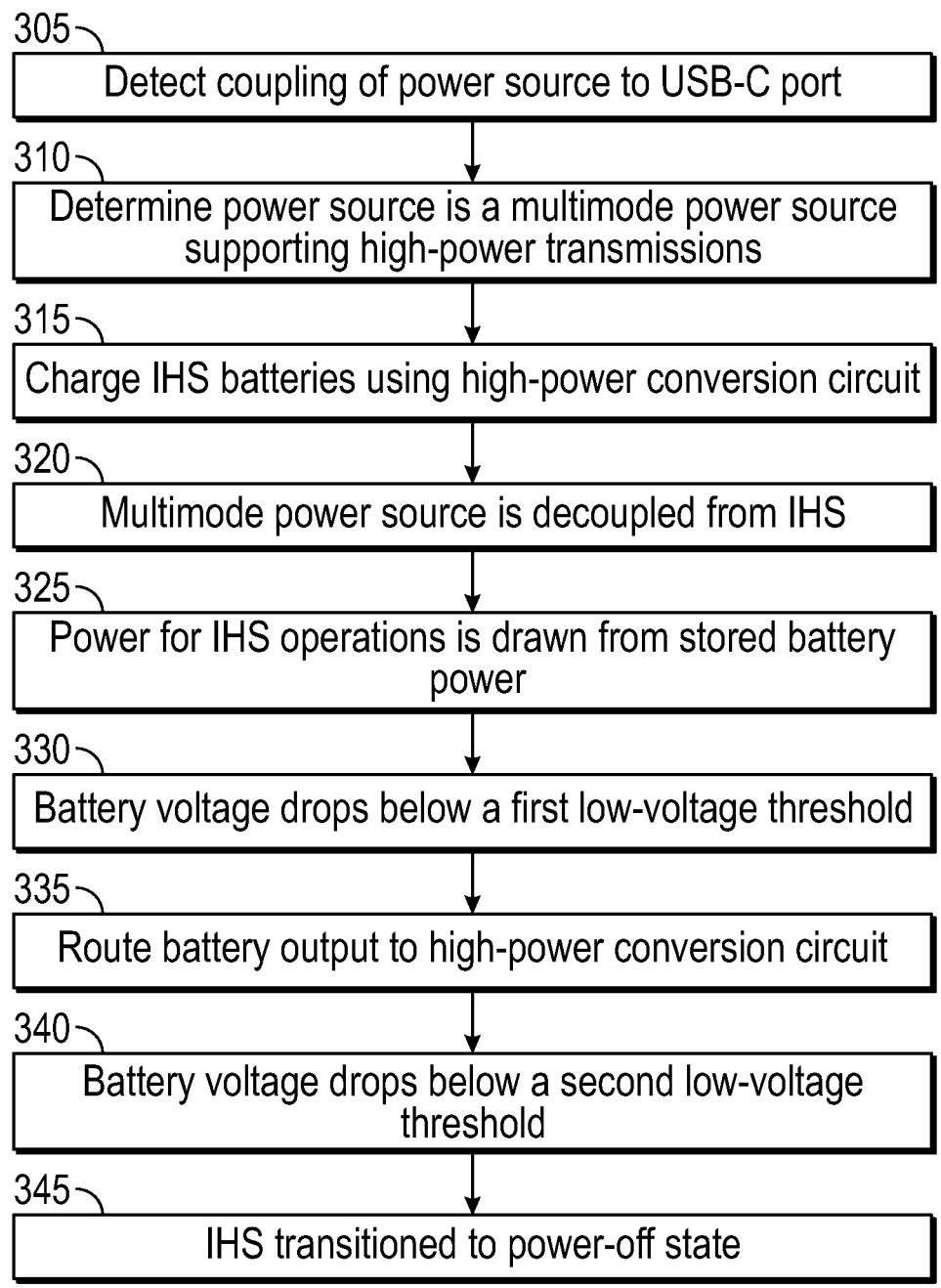
FIG. 3 is a flow chart diagram illustrating certain steps of a process according to various embodiments multimode power conversion in support of improved battery utilization.

FIG. 3 is a flow chart illustrating steps of a process according to various embodiments for multimode conversion of power that provides improved battery utilization. In some scenarios, embodiments may begin at block 305 with the coupling of a power source to a USB-C port of an IHS. As described with regard to FIG. 1, an IHS according to embodiments may include a USB controller that detects the coupling of a device to one or more USB-C ports supported by the IHS. For instance, upon coupling a USB-C connector of an AC adapter, such as AC adapter 210 described with regard to FIG. 2, to a USB-C port of an IHS, an USB controller of the IHS may detect a voltage on one or more power pins of the USB-C port.

In response to detecting a coupling of a power source to a USB-C port, at block 310, an IHS according to embodiments may determine whether the power source is a multimode USB-C adapter that supports high-power supply transmissions. In certain embodiments, the converter portion of a USB-C adapter, such as converter 210c of FIG. 2, may include circuitry and/or logic that detects a voltage being drawn by an IHS via the DC power cord of the adapter. In such embodiments, upon detecting a voltage drawn by the IHS, the USB-C adapter may be configured to generate a power supply identification (PSID) signal that is transmitted on a data channel supported by the USB-C adapter. The USB controller of the IHS may detect the transmission of such PSID signals by the USB-C adapter. The PSID signal may be detected by the USB controller and forwarded to an embedded controller, such as embedded controller 126 of the IHS of FIG. 1, that supports certain power mode configurations of the IHS. Based on the received PSID signal, the embedded controller may determine characteristics of the USB-C adapter, such as whether it supports high-power supply transmissions, as well as the USB-PD modes that are supported.

As described, an embedded controller of the IHS may negotiate with the multimode AC adapter for a high-power transmission of up to 60 volts Upon negotiating a high-power transmission by a multimode AC adapter, the embedded controller may route the high-power transmission to a high-power conversion circuit of the IHS power supply unit. The high-power conversion circuit may utilize a set of digital voltage dividers to efficiently convert the delivered high-power voltage to a lower voltage suitable for use in charging the battery system. Using the output of the high-power conversion circuit, at block 315, the battery system of the IHS may be charged. With the battery system charged either fully or partially, at block 320, the multimode AC adapter is decoupled from the IHS. With the power source no longer coupled, at block 325, power for IHS operations is drawn from the battery system.

While operating from battery power, the IHS may still conduct high-power operations and may still provide power to external devices coupled to the IHS. As the power stored in the battery system is consumed, the voltage stored in the battery decreases. At block 330, the battery voltage drops below a low-voltage threshold. As the voltage stored in the battery decreases, an corresponding increase in current is required in order to maintain a constant power output by the battery system. As described in additional detail with regard to FIG. 4, the increase in current required to maintain a constant power output during low-voltage conditions results in the need to account for higher currents in the power circuit of an IHS. These currents become prohibitively high as the voltage in the battery continues to drop. Accordingly, a portion of the energy stored within the battery system may be unusable by the IHS due to the high currents that are required to draw power from a low-voltage battery system. In existing systems, once a threshold for current in the power circuit is reached, no more power can be drawn from the battery system.

Using the embodiments provided herein, when such a low-voltage condition is identified, the power circuit of an IHS may route the power being drawn from the battery system to the high-power conversion circuit. As described above, in some embodiments, a high-power conversion circuit may include digital voltage dividers as well as boost capabilities, such as provided by inductive or capacitive voltage multipliers. Using a high-power conversion circuit including both buck and boost capabilities supports use of the same high-power conversion circuit by a multimode AC adapter to support high-power transmissions and for supporting efficient use of power stored in low-voltage battery systems. At block 335, the power drawn from a battery that has reached a low-voltage condition is routed to the high-power conversion circuit. Using the same boost capabilities as used by a multimode AC adapter, the voltage of the battery output is multiplied, thus resulting in a corresponding drop in the current level of the battery output. Now providing power at a reduced current, power may continue to be drawn from the battery system. In this manner, power may be drawn from battery systems in a low-voltage condition while avoiding the need to design the power circuit to account for high currents that are otherwise required to draw power during low-voltage conditions.

With the battery output routed through the high-power conversion circuit, at block 340, the voltage of the battery eventually drops below a second low-voltage threshold. In many battery systems, discharge of battery below a certain threshold may trigger a protection mode that maintains a minimal battery charge level for use in supporting certain core functions and initiating charging operations once a power source is available. Accordingly, the use of the high-power conversion circuit may enable drawing additional power from a battery, but once the voltage of the battery drops below a second low-voltage threshold, the remaining battery power is conserved. In response to detecting a battery voltage dropping below this second low-voltage threshold, at block 345, embedded controller may trigger a transition of the IHS to a power off state or a standby power state that conserves the remaining battery power.

FIG. 4 is a graph diagram illustrating certain aspects of the operation of a system configured according to various embodiments for providing multimode power conversion in support of improved battery utilization. Diagram 400 plots two curves 440 and 455 that illustrate the voltage 440 and current 445 of power drawn from a battery system over time. As described, a multimode power adapter may be used to delivery a high-power transmission to an IHS, where the high-power delivery is converted to a voltage that may be used in charging a battery system of the IHS. In FIG. 4, a constant power output is being generated through successive cycles in which a battery system is being charged, such as using the described multimode AC adapter, and power is then drawn from the charged battery system while maintaining the constant power output.

Prior to time 405, the IHS remains coupled to the multimode power source and the battery system has been fully charged to a maximum battery voltage 440a. At time 405, the power source is decoupled from the IHS and power is drawn from the charged battery to continue powering the operations of the IHS. As reflected in FIG. 4, during this discharge interval, the voltage 440 of the battery system begins to decrease, with a corresponding increase in the current 445 of the power drawn from the battery. As described, due to the high currents that result in the power circuit, once the voltage level drops below a threshold, additional power cannot be feasibly drawn from a battery. At time 410, such a low-voltage threshold is reached due to continued use of stored battery power. In the illustrated scenario, a power source is available at time 410 and charging of the battery system commences. As illustrated, the switch to charging of the battery system results in a gradual increase in the battery voltage 440. The switch to charging of the battery system also results in a corresponding drop in the current 445 drawn from the battery system, with the current 445 remaining constant as the voltage 440 increases and the current 445 gradually increasing when the voltage 440 has reached a maximum battery charge voltage 440a.

At time 415, the power source is no longer coupled to the IHS and power is again drawn from the battery system. As described, as the battery voltage 440 drops during this discharge phase a corresponding increase in current 445 is required to maintain a constant power output. As illustrated, as the battery voltage 440 nears a low-voltage condition, the voltage 440 output supported by the battery begins to decrease more quickly. Approaching time 420, the rate of decrease in the battery voltage 440 increases, thus resulting in a rapid increase 450 in current 455 in the power drawn from the battery system. Accounting for these high currents resulting from drawing power during a low-voltage battery condition requires accommodations within the power circuit of the IHS. The power circuit and power traces must be designed for maximum currents that can account for such spikes in current, or forgo the possibility of drawing additional power from a battery once it has reached this low-voltage condition. Embodiments provide a mechanism by which such high currents may be avoided during low-voltage battery conditions.

At time 420, a power source is again available and is used to charge the battery system back to a maximum battery voltage 440a. At time 425, the power source is decoupled and operations according to embodiments are initiated such that power may be drawn from a low-voltage battery without resulting in high currents. With the power source decoupled, the voltage 440 output of the battery system begins to drop, resulting in a gradual increase in the current 445 of the battery system output. At time 430, a low-voltage threshold 440b in the battery voltage is reached. As described with regard to FIG. 3, upon detecting this low-voltage threshold 440b, the power circuit of the IHS routes the power drawn from battery system to the high-power conversion circuit of the IHS. Utilizing the boost capabilities of the high-power conversion circuit, at time 430, the voltage 440 of the battery system output increases, thus resulting in a corresponding drop in the current 445 of the battery system output. With battery power routed to the high-power conversion circuit, the voltage output of the battery system may be maintained at a voltage that can be used to support IHS operation while currents remain below the current levels prior to use of the high-power conversion circuit. However, with the energy remaining in the battery continuing to drop, the voltage of the high-power conversion circuit output also drops after some duration. At time 435, the voltage 440 of the battery output again reaches the low-voltage threshold 440*b* and further power draws from the battery are discontinued, in some cases to preserve a minimal charge in the battery as per a protection mode.

Through use of the high-power conversion circuit during low-voltage battery conditions, additional power may be drawn from the battery system during the interval between time 430 and time 435. During this interval, power is drawn from a low-voltage battery without high currents in the battery output. Due to the operation of the high-power conversion circuit during this interval, the power circuit of an IHS may be designed without the need to support high currents, while still including a capability for drawing power from a low-voltage battery. Accordingly, embodiments provide an opportunity to reduce the maximum currents that must be supported by the portions of the power circuit that follow the high-power conversion circuit. By reducing the need to support higher currents, the size and weight may be reduced for the traces that are used to transmit power in these portions of the power circuit. The use of lower currents in power transmissions also results in less heat being generated within the power circuit.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for powering an Information Handling System (IHS), the method comprising:
    negotiating a high-power transmission from a multimode AC adapter coupled to a USB-C port of the IHS, wherein the multimode AC adapter supports USB-PD transmission and also supports the high-power transmissions of a voltage greater than voltages of the supported USB-PD transmissions, wherein the high-power transmissions comprise a nominal voltage greater than 50 volts and a peak voltage not exceeding 60 volts;
    charging a battery system of the IHS using an output of a power circuit that converts the high-power transmission to a charging voltage, wherein the power circuit converts the high-power transmission to an output of between 18 and 20 volts that is used to charge the battery system of the IHS;
    drawing power from the battery system of the IHS;
    when the battery system drops below a low-voltage threshold, routing the power drawn from the battery system to the power circuit;
    drawing power from the battery system of the IHS via the power circuit, wherein voltage multiplication capabilities of the power circuit are used to draw power from the battery system without increasing the current used to draw the power from the battery system; and
    when the battery system drops below a second low-voltage threshold, initiating an off power state of the IHS.

2. The method of claim 1, wherein routing the power drawn from the battery system to the power circuit increases the voltage of the power drawn from the battery system while operating below the low-voltage threshold.

3. The method of claim 2, wherein routing the power drawn from the battery system to the power circuit decreases the current of the power drawn from the battery system while operating below the low-voltage threshold.

4. The method of claim 1, wherein the power circuit comprises a plurality of digital voltage dividers, wherein one or more of the digital voltage dividers may be selected for use in converting the negotiated high-power charging transmission to the charging voltage.

5. The method of claim 4, wherein the power circuit comprises inductive and capacitive voltage multiplication capabilities operable for converting power drawn from the battery system.

6. The method of claim 1, wherein the second low-voltage threshold corresponds to a protection mode of the battery system.

7. The method of claim 1, wherein routing the power drawn from the battery system to the power circuit reduces heat generated while operating below the low-voltage threshold.

8. A system for powering an Information Handling System (IHS), the system comprising:
   a multimode AC (Alternating Current) adapter configured to supply power transmissions comprising USB-PD (Universal Serial Bus Power Delivery) transmissions and further comprising high-power transmissions of a voltage greater than voltages of the of USB-PD transmissions, wherein the high-power transmissions comprise a nominal voltage greater than 50 volts and a peak voltage not exceeding 60 volts; and
   the IHS configured to:
      negotiate the high-power transmission from a multimode AC adapter coupled to a USB-C port of the IHS;
      charge a battery system of the IHS using an output of a power circuit that converts the high-power transmission to a charging voltage, wherein the power circuit converts the high-power transmission to an output of between 18 and 20 volts that is used to charge the battery system of the IHS;
      draw power from the battery system of the IHS;
      when the battery system drops below a low-voltage threshold, route the power drawn from the battery system to the power circuit;
      draw power from the battery system of the IHS via the power circuit, wherein voltage multiplication capabilities of the power circuit are used to draw power from the battery system without increasing the current use to draw the power from the battery system; and
      when the battery system drops below a second low-voltage threshold, initiate an off power state of the IHS.

9. The system of claim 8, wherein routing the power drawn from the battery system to the power circuit increases the voltage of the power drawn from the battery system while operating below the low-voltage threshold.

10. The system of claim 9, wherein routing the power drawn from the battery system to the power circuit decreases the current of the power drawn from the battery system while operating below the low-voltage threshold.

11. The system of claim 8, wherein the second low-voltage threshold corresponds to a protection mode of the battery system.

12. The system of claim 8, wherein the power circuit comprises a plurality of digital voltage dividers, wherein one or more of the digital voltage dividers may be selected for use in converting the negotiated high-power charging transmission to the charging voltage, and wherein the power circuit further comprises inductive and capacitive voltage multiplication capabilities operable for converting power drawn from the battery system.

13. The system of claim 8, wherein routing the power drawn from the battery system to the power circuit reduces heat generated while operating below the low-voltage threshold.

14. An Information Handling System (IHS) provided power transmissions using a multimode AC adapter, the IHS comprising:
   one or more processors;
   a memory device coupled to the one or more processors, the memory device storing computer-readable instructions that, upon execution by the one or more processors, cause execution of an operating system of the IHS;
   a battery system; and
   an embedded controller comprising a memory having program instructions stored thereon that, upon execution by a logic unit of the embedded controller, cause the embedded controller to:
      receive a high-power transmission from a multimode AC adapter coupled to a USB-C port of the IHS, wherein the multimode AC adapter supports USB-PD transmission and also supports the high-power transmissions of a voltage greater than voltages of the supported USB-PD transmissions, wherein the high-power transmissions comprise a nominal voltage greater than 50 volts and a peak voltage not exceeding 60 volts;
      charge a battery system of the IHS using an output of a power circuit that converts the high-power transmission to a charging voltage, wherein the power circuit converts the high-power transmission to an output of between 18 and 20 volts that is used to charge the battery system of the IHS;
      draw power from the battery system of the IHS;
      when the battery system drops below a low-voltage threshold, route the power drawn from the battery system to the power circuit;
      draw power from the battery system of the IHS via the power circuit, wherein voltage multiplication capabilities of the power circuit are used to draw power from the battery system without increasing the current used to draw the power from the battery system; and
      when the battery system drops below a second low-voltage threshold, initiate an off power state of the IHS.

15. The IHS of claim 14, wherein routing the power drawn from the battery system to the power circuit increases the voltage of the power drawn from the battery system while operating below the low-voltage threshold.

16. The IHS of claim 15, wherein routing the power drawn from the battery system to the power circuit decreases the current of the power drawn from the battery system while operating below the low-voltage threshold.

17. The IHS of claim 14, wherein the second low-voltage threshold corresponds to a protection mode of the battery system.

* * * * *